US 8,452,636 B1

(12) United States Patent
Verastigui (10) Patent No.: US 8,452,636 B1
(45) Date of Patent: May 28, 2013

(54) SYSTEMS AND METHODS FOR MARKET PERFORMANCE ANALYSIS

(75) Inventor: Juan Verastigui, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 855 days.

(21) Appl. No.: 11/927,056

(22) Filed: Oct. 29, 2007

(51) Int. Cl.
*G06Q 30/00* (2012.01)
*G06Q 10/00* (2012.01)

(52) U.S. Cl.
USPC .......................... 705/7.29; 707/754

(58) Field of Classification Search
USPC .............. 705/35, 36, 10, 8; 707/999
See application file for complete search history.

(56) References Cited

U.S. PATENT DOCUMENTS

| 5,924,077 | A * | 7/1999 | Beach et al. ................... 705/10 |
| 5,930,764 | A | 7/1999 | Melchione et al. |
| 6,363,353 | B1 | 3/2002 | Chen |
| 6,611,839 | B1 * | 8/2003 | Nwabueze ............................ 1/1 |
| 7,117,219 | B1 | 10/2006 | Powers et al. |
| 7,171,406 | B2 | 1/2007 | Chen et al. |
| 7,181,422 | B1 * | 2/2007 | Philip et al. ................. 705/36 R |
| 7,191,183 | B1 * | 3/2007 | Goldstein ..................... 707/602 |
| 7,257,579 | B2 * | 8/2007 | Wachholz-Prill ..................... 1/1 |
| 7,552,145 | B1 * | 6/2009 | Errigo et al. ............................ 1/1 |
| 7,707,192 | B1 * | 4/2010 | Lu et al. ........................ 707/687 |
| 7,711,660 | B1 * | 5/2010 | Gentile et al. ..................... 706/8 |
| 7,962,483 | B1 * | 6/2011 | Thomas ........................ 707/736 |
| 2002/0099563 | A1 * | 7/2002 | Adendorff et al. ................ 705/1 |
| 2002/0133368 | A1 * | 9/2002 | Strutt et al. ........................ 705/1 |
| 2002/0152155 | A1 | 10/2002 | Greenwood et al. |
| 2003/0088491 | A1 | 5/2003 | Liu et al. |
| 2003/0093429 | A1 * | 5/2003 | Nishikawa et al. ............. 707/10 |
| 2003/0115123 | A1 * | 6/2003 | Lang ............................... 705/36 |
| 2003/0130991 | A1 * | 7/2003 | Reijerse et al. .................... 707/3 |
| 2003/0191566 | A1 * | 10/2003 | Ben-Assa ........................ 701/29 |
| 2004/0015783 | A1 * | 1/2004 | Lennon et al. ................ 715/523 |
| 2004/0030667 | A1 * | 2/2004 | Xu et al. ............................. 707/1 |
| 2004/0078275 | A1 * | 4/2004 | Ismert et al. ..................... 705/26 |
| 2004/0111344 | A1 | 6/2004 | Fetter et al. |
| 2004/0128169 | A1 | 7/2004 | Lusen |
| 2004/0148239 | A1 * | 7/2004 | Albee et al. ..................... 705/36 |
| 2004/0225603 | A1 * | 11/2004 | Allen et al. ..................... 705/39 |

(Continued)

OTHER PUBLICATIONS

"Oracle 8i Release 2 (8.1.6) New Features" published by webarchive.org on Jan. 8, 2007, pp. 1-11.*

(Continued)

*Primary Examiner* — Brian Epstein
(74) *Attorney, Agent, or Firm* — Brooks, Cameron & Huebsch, PLLC (57) ABSTRACT

A system comprises a data integration module to receive data from two or more different financial service systems, a data transformation module to transform the data, a data storage module to store the transformed data in a persistent raw data store, an analytic module configured use a business rule to condition data stored in the persistent raw data store, and a report module to organize the conditioned data for reporting. A system comprises a business rules engine, an analytic engine to automatically generate a result data set using a rule, and a report engine organize data extracted from the result data set in a report. A system comprises a raw data storage module to store persistent raw data, a processed data storage module to store processed data, a decision module configured to determine a scope of a business rule and adaptively apply the business rule to the data.

21 Claims, 7 Drawing Sheets

U.S. PATENT DOCUMENTS

| | | | |
|---|---|---|---|
| 2004/0230508 A1* | 11/2004 | Minnis et al. | 705/35 |
| 2004/0230872 A1 | 11/2004 | Mullally et al. | |
| 2004/0267751 A1* | 12/2004 | Dill et al. | 707/9 |
| 2005/0066240 A1* | 3/2005 | Sykes et al. | 714/48 |
| 2005/0080821 A1* | 4/2005 | Breil et al. | 707/104.1 |
| 2005/0097088 A1* | 5/2005 | Bennett et al. | 707/3 |
| 2005/0114308 A1* | 5/2005 | Hyland et al. | 707/3 |
| 2005/0187797 A1 | 8/2005 | Johnson | |
| 2006/0004842 A1 | 1/2006 | Wu et al. | |
| 2006/0015895 A1* | 1/2006 | Stone | 725/32 |
| 2006/0106700 A1* | 5/2006 | Boren et al. | 705/35 |
| 2006/0190310 A1* | 8/2006 | Gudla et al. | 705/7 |
| 2007/0011176 A1* | 1/2007 | Vishnubhotla | 707/100 |
| 2007/0156673 A1 | 7/2007 | Maga et al. | |
| 2007/0168271 A1* | 7/2007 | Szurek et al. | 705/36 R |
| 2007/0203915 A1 | 8/2007 | McCully | |
| 2007/0233586 A1 | 10/2007 | Liu et al. | |
| 2007/0255574 A1* | 11/2007 | Polo-Malouvier et al. | 705/1 |
| 2008/0021762 A1* | 1/2008 | Coon et al. | 705/10 |
| 2008/0201381 A1* | 8/2008 | Desai et al. | 707/200 |
| 2008/0215621 A1 | 9/2008 | Ravindran et al. | |
| 2009/0043730 A1* | 2/2009 | Lavdas et al. | 707/2 |
| 2009/0076884 A1* | 3/2009 | Johnson et al. | 705/10 |

OTHER PUBLICATIONS

J.D. Roth, "Which Financial Records to Keep and How Long to Keep Them" published Aug. 3, 2006 by www.getrichslowly.org (pp. 1-2 of 2).*

"What Financial Records to Keep, How Long to Keep Them," published by www.webarchive.org on Aug. 6, 2006 (pp. 1-3 of 3).*

"Application Areas: Modeling and Simulation", [online]. Gensym, 2007 [retrieved on Oct. 11, 2007]. Retrieved from the Internet: <URL: www.gensym.com/?p=modeling_and_simulation>, 1 p.

"Brand Marketing and Implementation: Sell more through better marketing", [online]. MarketTools, Inc., 2007 [retrieved on Oct. 22, 2007] Retrieved from the Internet: <URL: www.markettools.com/research_services/research_solutions/bmi.php >, 1 p.

"Business Rules Management", [online]. Visual Rules, 2007 [retrieved on Oct. 11, 2007]. Retrieved from the Internet <URL: www.visual-rules.de/en/01_produkt/produkt.html>, 2 p.

* cited by examiner

SYSTEMS AND METHODS FOR MARKET PERFORMANCE ANALYSIS

CROSS REFERENCES

This application is related to U.S. applications entitled "SYSTEMS AND METHODS FOR MARKET PERFORMANCE ANALYSIS" (Ser. No. 11/927,090) and "SYSTEMS AND METHODS FOR MARKET PERFORMANCE ANALYSIS" (Ser. No. 11/927,114), each of which being filed on even date herewith.

TECHNICAL FIELD

Various embodiments described herein relate generally to computer systems, and more particularly, but not by way of limitation, to systems and methods for market performance analysis.

BACKGROUND

Product marketing is a complex science. In some ways, product marketing and analysis is made even more complex in light of modern technology. Using modern computer networks and databases, an incredible amount of information is available for different types of analysis. However, with the increased amount of data comes the risk of compromising the confidence of any analysis performed using such data.

SUMMARY

Systems and methods for market performance analysis are described. In an embodiment, a system comprises a data integration module configured to receive data from two or more different financial service systems selected from a banking system, an insurance system, and an investment system. The system further comprises a data transformation module configured to transform the data to a compatible format, a data storage module configured to store the transformed data in a persistent raw data store, an analytic module configured to use a business rule to condition data stored in the persistent raw data store, and a report module configured to organize the conditioned data for reporting.

In an embodiment, a system comprises a business rules engine, an analytic engine, operatively coupled to the business rules engine, the analytic engine configured to automatically generate a result data set using a rule available from the business rules engine, wherein the result data set combines data from two or more different financial services selected from banking, insurance, and investments, and a report engine, operatively coupled to the analytic engine, the report engine configured to extract data from the result data set and organize the extracted data in a report, wherein the report comprises a measurement of product usage within the two or more different financial services.

In an embodiment, a system comprises a raw data storage module configured to store a persistent raw data set. The system further comprises a processed data storage module configured to store a processed data set, wherein the processed data set comprises data selected from the persistent raw data set based on a set of fixed business rules. The system further comprises a decision module configured to determine a scope of a configurable business rule and adaptively apply the configurable business rule to the persistent raw data set or the processed data set based on the determination of the scope of the configurable business rule, to obtain an output data set. The system further comprises an output module configured to present the output data set.

DETAILED DESCRIPTION

The following detailed description includes references to the accompanying drawings, which form a part of the detailed description. The drawings show, by way of illustration, example embodiments. These embodiments, which are also referred to herein as "examples," are described in enough detail to enable those skilled in the art to practice aspects of the inventive subject matter.

In this document, the terms "a" or "an" are used, as is common in patent documents, to include one or more than one. In this document, the term "or" is used to refer to a nonexclusive or, unless otherwise indicated.

System Overview

Figure 1:
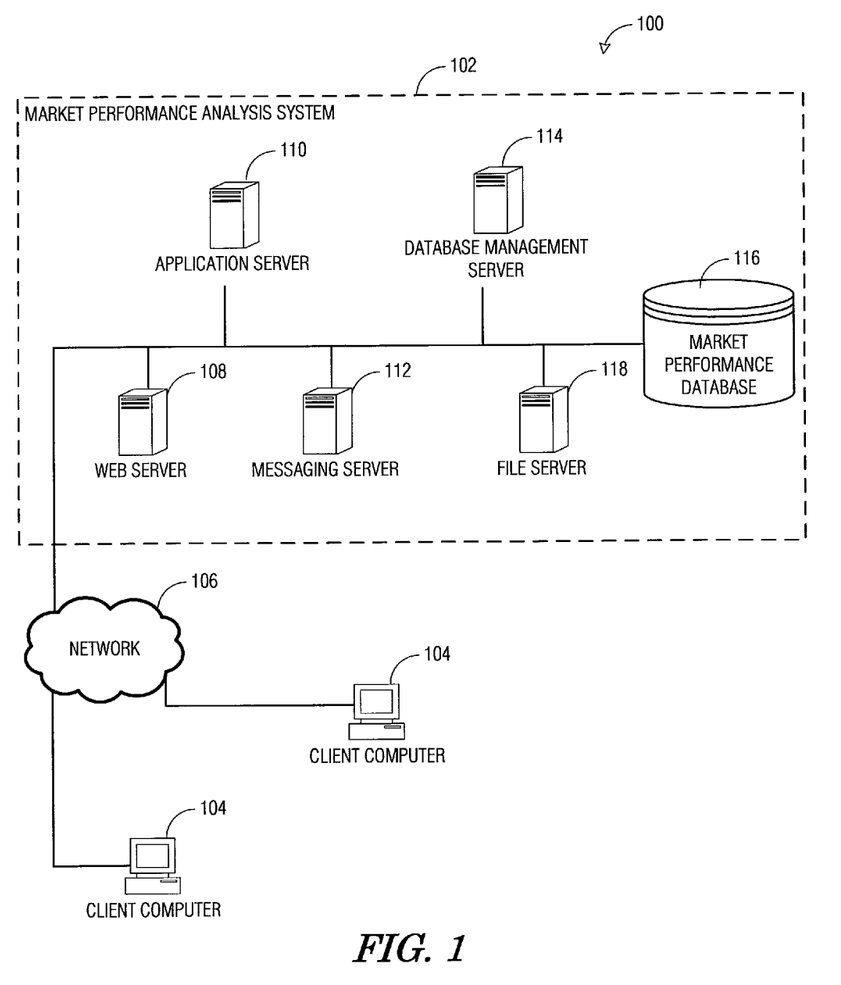
FIG. 1 is a schematic view of a computer network system according to various embodiments.

FIG. 1 is a schematic view of a computer network system 100 according to various embodiments. The computer network system 100 includes a market performance analysis system 102 and a client computer 104, communicatively coupled via a network 106. In an embodiment, the market performance analysis system 102 includes a web server 108, an application server 110, a messaging server 112, a database management server 114, which is used to manage at least a market performance database 116, and a file server 118. The market performance analysis system 102 may be implemented as a distributed system, for example one or more elements of the market performance analysis system 102 may be located across a wide-area network from other elements of the market performance analysis system 102. As another example, a server (e.g., web server 108, file server 118, database management server 114) may represent a group of two or more servers, cooperating with each other, in providing a pooled, distributed, or redundant computing model.

The network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LAN's or WAN's, such as the Internet. The various devices coupled to the network 106 may be coupled to the network 106 via one or more wired or wireless connections.

The web server 108 may communicate with the file server 118 to publish or serve files stored on the file server 118. The web server 108 may also communicate or interface with the application server 110 to enable web-based presentation of information. For example, the application server 110 may consist of scripts, applications, or library files that provide primary or auxiliary functionality to the web server 108 (e.g., multimedia, file transfer, or dynamic interface functions). In addition, the application server 110 may also provide some or the entire interface for the web server 108 to communicate with one or more of the other servers in the market performance analysis system 102, e.g., the messaging server 112 or the database management server 114. The web server 108, either alone or in conjunction with one or more other computers in the market performance analysis system 102, may provide a user-interface. The user-interface may be implemented using a variety of programming languages or programming methods, such as HTML (HyperText Markup Language), VBScript (Visual Basic® Scripting Edition), JavaScript™, XML® (Extensible Markup Language), XSLT™ (Extensible Stylesheet Language Transformations), AJAX (Asynchronous JavaScript and XML), Java™, JFC (Java™ Foundation Classes), and Swing (an Application Programming Interface for Java™).

In an embodiment, the client computer 104 may include a client program to interface with the market performance analysis system 102. The client program may include commercial software, custom software, open source software, freeware, shareware, or other types of software packages. In an embodiment, the client program includes a thin client designed to provide query and data manipulation tools for a user of the client computer 104. The client program may interact with a server program hosted by, for example, the application server 110. Alternatively, the client program may interface with the database management server 114.

The application server 110 may also include a business rules application platform to create, manage, and administer business rules. The business rules application platform may include commercial packages, such as ORACLE® BUSINESS RULES provided by ORACLE CORP. of Redwood Shores, Calif. The application server 110 may also include an ETL (extract, transform and load) package, such as POWERCENTER® provided by INFORMATICA CORP. of Redwood City, Calif.

The market performance database 116 may be composed of one or more logical or physical databases. For example, the market performance database 116 may be viewed as a system of databases that when viewed as a compilation, represent a "market performance database." Sub-databases in such a configuration may include a product database, a customer database, a sales database, a marketing database, a business rules database, an operations database, and the like. The market performance database 116 may be implemented as a relational database, a centralized database, a distributed database, an object oriented database, or a flat database in various embodiments.

During operation, data from multiple data sources is imported into the market performance database 116. Data sources may exist within an organization, such as a sales department or a subsidiary corporation, or exist at an external source, such as a business affiliate or a public record source. The data may be imported on a scheduled basis, such as weekly, monthly, quarterly, or some other regular or periodic interval. Alternatively, the data may be imported on-demand.

After data importation, the data may be standardized and then stored in a common database or data mart. For example, database records from business affiliates or other external (or even internal) sources may not be in a compatible format with the common database or data mart (e.g., market performance database 116). Data conditioning may include data rearrangement, normalization, filtering (e.g., removing duplicates), sorting, binning, or other operations to transform the data into a common format (e.g., using similar date formats, name formats, address fields, etc.).

Once imported and standardized, the data may be considered to be in a "raw" form. That is, the data accurately represents the source data, albeit reformatted or rearranged for the sake of compatibility and consistency. In an embodiment, the "raw" data is stored for a relatively long period of time, such as six months or even several years. This persistent raw data storage may be useful for various purposes, such as data backup and restore, data auditing, or data modeling. In an embodiment, the persistent raw data is stored using a rolling window of data. For example, an administrative user may define a window size of six months. When new data is saved in the persistent raw data, data older than the window size may be expunged from the persistent raw data storage. In an embodiment, more than one window sizes are used and each window size may be associated with a particular data. For example, banking data may be stored using a window size of six months, while investment data may be stored using a window size of four years. As another example, customer data may be stored using a window size that effectively stores the data for at least the expected lifetime of the customer (e.g., a window size of one-hundred years).

In an embodiment, the persistent raw data is used as a basis for reporting and analysis. For example, one or more business rules may be applied to a subset of data from the persistent raw data, resulting in filtered data. The filtered data may then be presented using a report or a simulation environment, in various embodiments. Within a simulation environment, the filtered data may be further manipulated using simulated business rules or other simulated variables. Simulation may be used, for example, to model "what if" scenarios. Simulation may also be useful to determine which set of input parameters are needed to produce a desired result. Depending on the business rules used in the simulation, the simulator may need to access data from the persistent raw data store or from the filtered data. For example, business rules that add to an existing set of previously applied business rules may be aggregated on the filtered data; however, business rules that replace or modify previously applied business rules should be applied to the persistent raw data to avoid incorrect results. If several levels of simulation are used, then intermediate data sets may be maintained and business rules may be applied logically to avoid applying inconsistent, ineffective, or redundant business rules on previously filtered data.

Reports generated using the filtered data (or from data obtained in a simulator) may include dynamic navigation mechanisms. For example, a report may include a user-interface control, such as a hyperlink, that allows a user to drill down and obtain more details about data presented in the report. As an illustrative example, a user may be presented with a number that represents a number of open accounts related to the user's business. The user may be able to activate a control (e.g., mouse click) to bring up another user-interface display (e.g., a pop-up window, a child window, a dynamic frame, a comment window, etc.) that includes an indication of which business rule or rules were used to obtain the particular number of open accounts. The user may also be presented with a data history (e.g., the data source, a description of data conditioning, a description of the business rules applied and in which order, a brief description of what the data represents, etc.). Other types of interface elements to drill down into data views or meta-data are described below.

Figure 2:
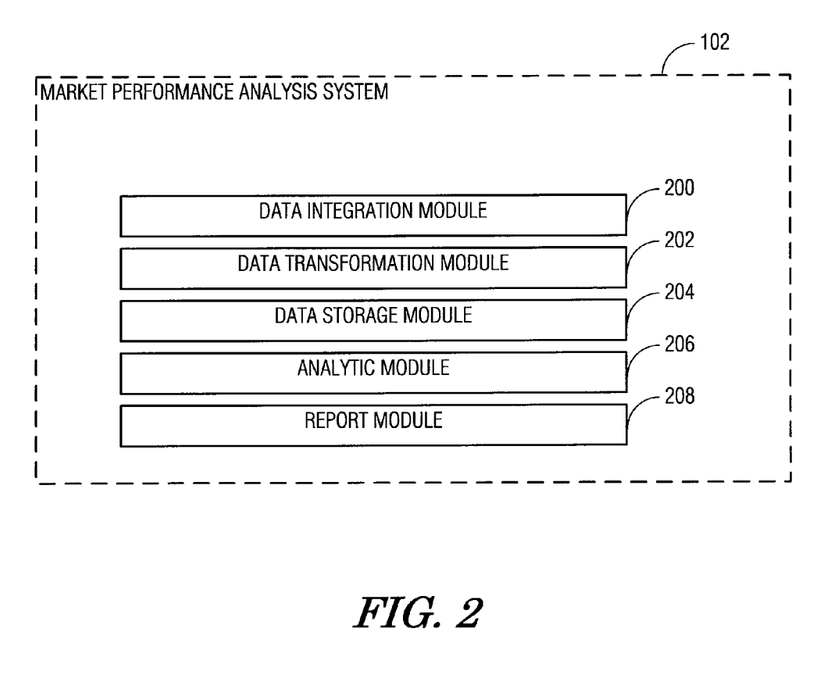
FIG. 2 is a block diagram of modules of the market performance analysis system shown in FIG. 1 according to various embodiments.
Figure 3:
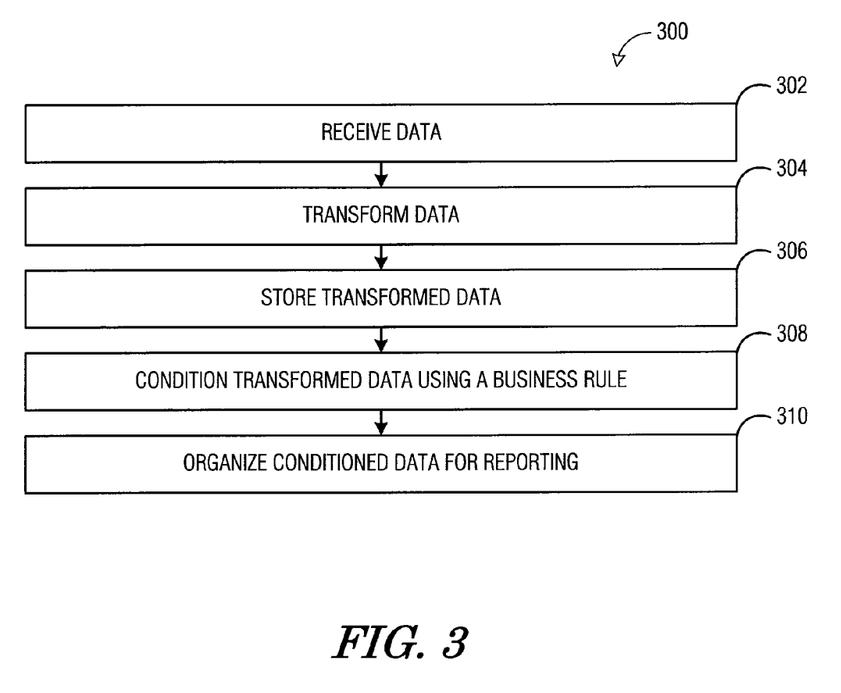
FIG. 3 is a flowchart illustrating a method according to various embodiments.

In various embodiments, the market performance analysis system 102 may use a business rule, which may be defined using the application server 110. A report using the business rule may then be obtained. FIGS. 2 and 3 generally describe systems and processes that may perform such tasks. In some embodiments, processes are implemented as instructions on a computer-readable medium.

FIG. 2 is a block diagram of modules of the market performance analysis system 102 shown in FIG. 1, according to various embodiments. The modules include a data integration module 200 to receive data, a data transformation module 202 to transform the data to a compatible format, a data storage module 204 to store the transformed data in a data store, an analytic module 206 to use a business rule to condition data stored in the persistent raw data store, and a report module 208 to produce a report.

The data integration module receives data from two or more different financial service systems. In an embodiment, the two or more different financial service systems are selected from a banking system, an insurance system, and an investment system. The banking system, insurance system, and investment system may be grouped under the same corporate entity, in an embodiment.

The data transformation module 202 transforms the data to a compatible format. Data may be transformed to conform to a database schema (e.g., normalization of the data), to conform to data format rules (e.g., names using the format "last, middle, first" or formatting a value using a fixed field size), or to conform to fundamental business rules (e.g., "sanity checks"). The data storage module 204 stores the transformed data in a persistent raw data store. For example, the transformed data may be stored in the market performance database 116.

The analytic module 206 uses a business rule to condition data stored in the persistent raw data store. The business rule may be used to impose a certain level of confidence in the resulting numbers. For example, in a banking system, a large number of savings accounts are substantially inactive. Banking customers may have opened a savings account to open a checking account, and then ignored or abandoned use of the savings account. In such cases, the banking management may wish to dismiss these inactive accounts when counting the number of existing savings accounts. A simple business rule that may be used for this purpose may be "if no savings account activity in last year, then don't count" or "if savings account balance <10 then don't count." Either rule may be helpful in reducing the number of false positives and thereby obtain a more accurate representation of the actual number of savings accounts (that are important to the banking management). In an embodiment, the conditioned data is stored, for example in the market performance database 116.

The report module organizes the conditioned data for reporting. In an example, the report module may create a temporary storage area, such as a temporary table in the market performance database 116, and store data for eventual reporting in the temporary table.

In a further embodiment, the modules include a presentation module configured to present a report using the organized conditioned data. In a further embodiment, the presentation module presents the report using a product view. The product view may include a summary of products or services offered and corresponding numbers, or counts, that indicate a number of individuals that own or use the product or service. The counts may also be indicative of a number of households or other domestic or demographic organization (e.g., nuclear families, extended families, domestic partnerships, etc.).

In an embodiment, the product view is based on distinguishing account-type products from agreement-type products. For example, agreement-type products, such as insurance products, may be distinguished or separated in a report from account-type products, such as credit card, checking, loan, or other accounts.

In an embodiment, the report comprises an indication of a basis of each value represented in the report. For example, the basis may include an indication of the origin or transformations performed on the value. In a further embodiment, the basis of a value comprises a business rule used to obtain the value. For example, a value may include a subscript or superscript indicia that indicate which business rule or rules were used to obtain the number shown. In a further embodiment, the basis of a value comprises a data lineage. For example, the data source or sources may be included using a notation indicia (e.g., in conjunction with a legend).

In an embodiment, the product view is based on an importance of a product with respect to one of an economic business metric or a business relationship. The product view may be sorted or filtered (e.g., using business rules) using a gross income, net income, gross sales, proportionate income, or other economic business metric. Similarly, the product view may be sorted or filtered using a strength of a business relationship (e.g., measured in economic terms, subjective belief, contractual bindings, length of relationship, or otherwise), a type of business relationship (e.g., parent-subsidiary, formal partner company, informal business associate, etc.), or other classification, such as geographic relationships.

FIG. 3 is a flowchart illustrating a method 300 according to various embodiments. At 302, data is received from two or more different financial service systems selected from a banking system, an insurance system, and an investment system. At 304, the data is transformed to a compatible format. At 306, the transformed data is stored in a persistent raw data store. At 308, a business rule is used to condition data stored in the persistent raw data store. At 310, the conditioned data is organized for reporting.

In a further embodiment, a report is presented using the organized conditioned data. In a further embodiment, the report is presented using a product view. In an embodiment, the product view is based on distinguishing account-type products from agreement-type products. In an embodiment, the report comprises an indication of a basis of each value represented in the report. In an embodiment, the basis of a value comprises a business rule used to obtain the value. In an embodiment, the basis of a value comprises a data lineage.

Figure 4:
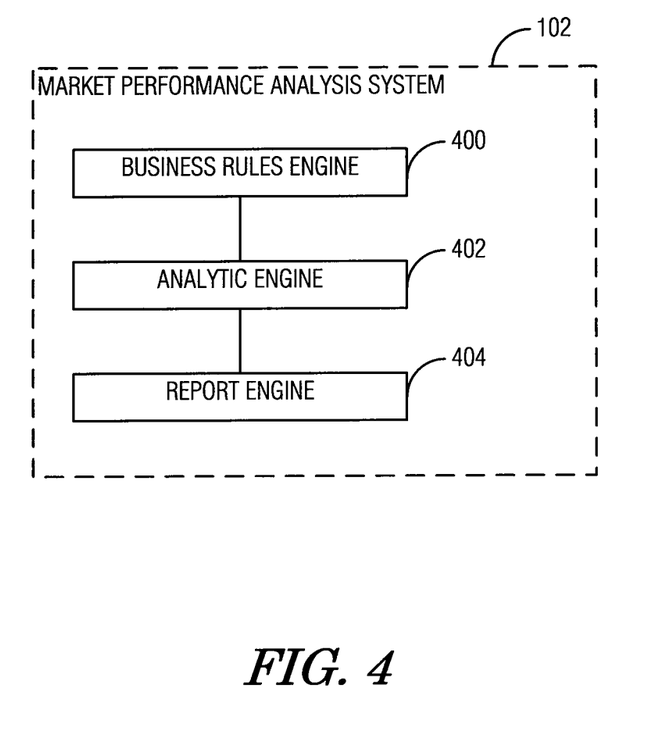
FIG. 4 is a block diagram of processing modules of the market performance analysis system shown in FIG. 1 according to various embodiments.
Figure 5:
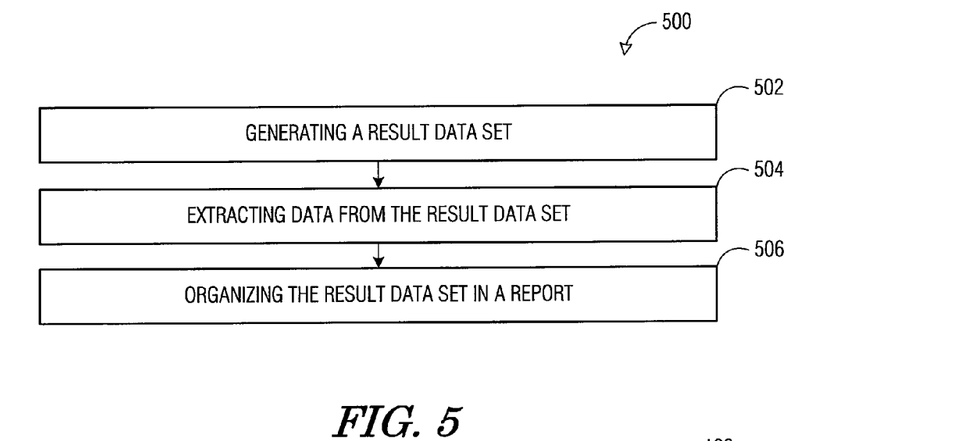
FIG. 5 is a flowchart illustrating a method according to various embodiments.

FIGS. 4 and 5 generally describe systems and processes that provide business rule management and reporting. In some embodiments, processes are implemented as instructions on computer-readable medium.

FIG. 4 is a block diagram of modules of the market performance analysis system 102 shown in FIG. 1, according to various embodiments. The modules include a business rules engine 400, an analytic engine 402, and a report engine 404.

The business rules engine 400 may include one or more processing modules to allow a user or process to build and manage business rules. In an embodiment, the business rules engine is hosted or incorporated into the application server 110. Business rules may be stored using a variety of methods, such as in a database, a file, or encoded in software. For example, rules may be stored as programmatic conditional statements in a database, to be accessed using a database management interface or database access software. As another example, rules may be stored using files, such as a spreadsheet or a file formatted using a standardized interface language (e.g., XML). As yet another example, rules may be hard-coded in analysis software or other application software. Hard-coding rules may have an advantage of preventing intentional or unintentional modifications, which may affect the results produced in a report. For example, hard-coding rules may prevent analysts or management from manipulating the data to present a favorable, but inaccurate, outcome. As another example, hard-coding rules may also prevent user error or other unintentional modifications that produce undetected inaccurate results. Business rules may vary in complexity. For example, rules may be dependent on each other, rules may be nested, or rules may use advanced comparison operations, such as selection from lists, sub-string searches, or regular expression tests.

The analytic engine 402 is operatively coupled to the business rules engine and automatically generates a result data set using a rule available from the business rules engine. In an embodiment, the result data set combines data from two or more different financial services selected from banking, insurance, and investments.

The report engine 404 is operatively coupled to the analytic engine and extracts data from the result data set and organizes the extracted data in a report. In an embodiment, the report comprises a measurement of product usage within the two or more different financial services. The measurement of product usage may represent a number of times a customer accesses an account associated with a product (e.g., a credit card usage, a bank account usage, or a home equity account usage), a number of times a service is used (e.g., a customer support service, a flower delivery service, a product information request service, etc.), or other usage measurements related to financial service products or services.

In an embodiment, the analytic engine 402 is incorporated or integrated into the business rules engine 400. In such an embodiment, data manipulation, such as filtering, grouping, extracting, or sorting, may be performed by the business rules engine 400 with the augmented abilities available from the analytic engine 402. In another embodiment, the analytic engine 402 is incorporated or integrated into the report engine 404 to provide similar functionality when creating, managing, or producing reports via the report engine 404.

In an embodiment, the measurement of product usage within the two or more different types of financial services comprises a measurement of product usage based on a change in a number of products. For example, the number of products available from month-to-month may be indicative of more or less demand, depending on marketed indicators. In such an example, an increase in available products may be used to indicate a higher product usage.

In an embodiment, the measurement of product usage within the two or more different types of financial services comprises a measurement of product usage based on a change in a number of individuals associated with products being measured. As the number of customers increase or decrease, an inference may be made to the associated products that are receiving a corresponding increase or decrease in popularity, and consequently, usage.

In an embodiment, the measurement of product usage within the two or more different types of financial services comprises a measurement of product usage based on a change in a number of households associated with products being measured. Similar to the measurement based on the change in the number of individuals, a measure based on the number of households may be more accurate for some products or services that are targeted to households, such as a family health plan, where a change in the total number of individuals may be less meaningful to analysis than a change in the total number of households.

In an embodiment, the automated report comprises a drill-down mechanism usable to obtain a detailed set of data related to data contained in the automated report. The drill-down mechanism may include a series of user-interface windows, or other dynamic programmatic element that allows a user to view increasing (or decreasing) levels of granularity showing details about the data. For example, the granularity details may show a when, how, or why data was manipulated, modified, or conditioned to arrive at the present result.

In an embodiment, the rule available from the business engine comprises an exclusionary rule. In a further embodiment, the exclusionary rule is based on a relationship between an individual and a product, wherein the individual is a consumer of the product, and wherein the product is offered by one of the financial services. An exclusionary rule may be useful to exclude certain data points in a data population that may represent false positives. For example, counting a number of open checking accounts may be one way of measuring a product usage. However, without an exclusionary rule that removes inactive checking accounts (e.g., accounts that have not been accessed in over six months) the number of open checking accounts may include a certain number of false positives and may not fully or accurately represent the data view that a user expects to see. In addition, using unfiltered data may result in faulty analysis that relies on the intermediate result.

FIG. 5 is a flowchart illustrating a method 500 according to various embodiments. At 502, a result data set is generated. In an embodiment, the result data set is automatically generated using a rule available from a business rules engine, wherein the result data set combines data from two or more different financial services selected from banking, insurance, and investments. At 504, data from the result data set is extracted. At 506, the extracted data is organized for reporting.

In an embodiment, extracted data from the result data set is organized in a report. The report may include a measurement of product usage within the two or more different financial services. In an embodiment, the measurement of product usage within the two or more different types of financial services includes a measurement of product usage based on a change in a number of products. In an embodiment, the measurement of product usage within the two or more different types of financial services includes a measurement of product usage based on a change in a number of individuals associated with products being measured. In an embodiment, the measurement of product usage within the two or more different types of financial services includes a measurement of product usage based on a change in a number of households associated with products being measured. In an embodiment, the automated report comprises a drill-down mechanism usable to obtain a detailed set of data related to data contained in the automated report. In an embodiment, the rule available from the business engine comprises an exclusionary rule. In a further embodiment, the exclusionary rule is based on a relationship between an individual and a product, wherein the individual is a consumer of the product, and wherein the product is offered by one of the financial services.

Figure 6:
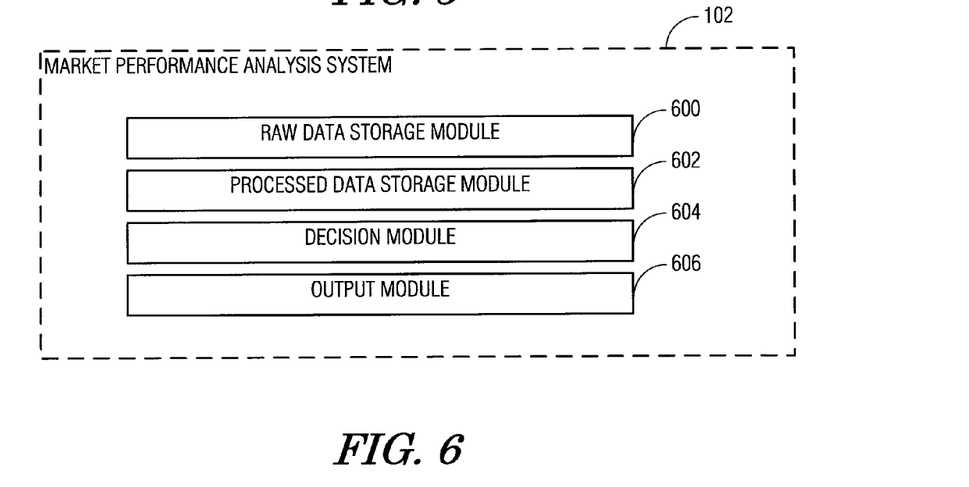
FIG. 6 is a block diagram of processing modules of the market performance analysis system shown in FIG. 1 according to various embodiments.
Figure 7:
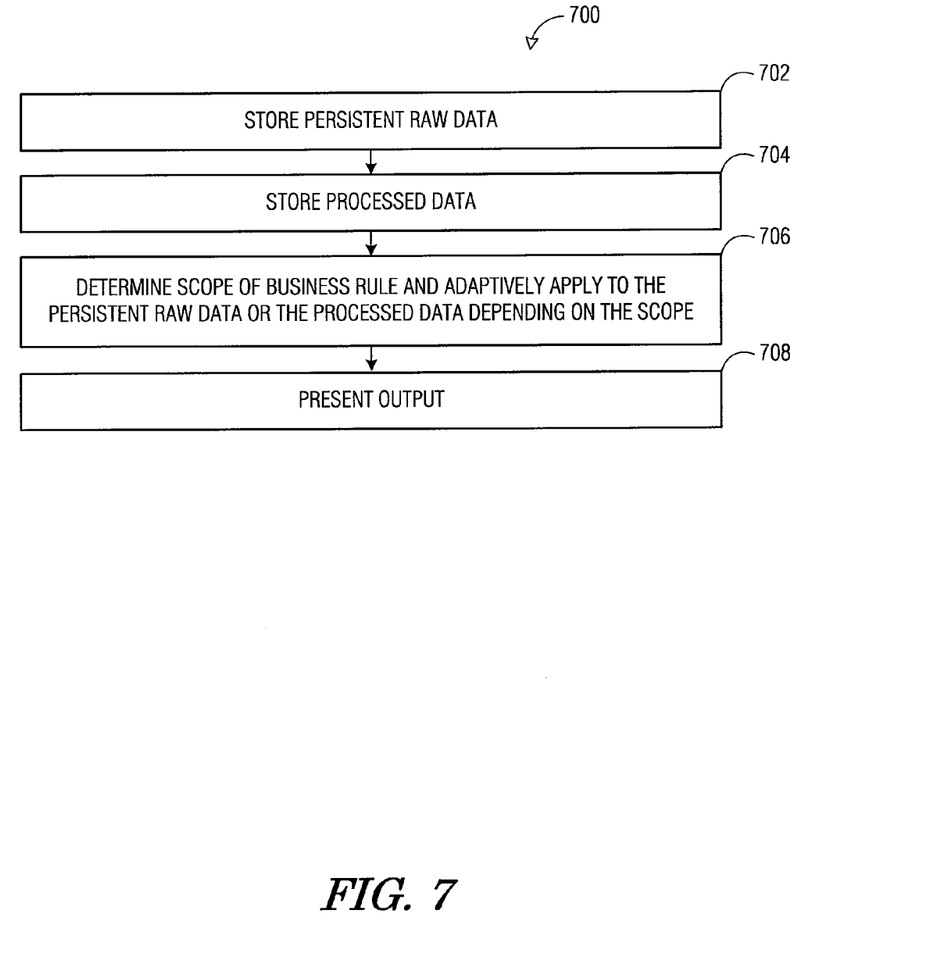
FIG. 7 is a flowchart illustrating a method according to various embodiments.

FIGS. 6 and 7 generally describe systems and processes provide an environment to manage and test simulated business rules. In some embodiments, processes are implemented as instructions on computer-readable medium.

FIG. 6 is a block diagram of modules of the market performance analysis system 102 shown in FIG. 1, according to various embodiments. The modules include a raw data storage module 600 to store a persistent raw data set, a processed data storage module 602 to store a processed data set, a decision module 604 to apply a business rule to data, and an output module 606 to present output after the application of the business rule.

The raw data storage module 600 stores a persistent data set. Persistent data may include data that is received from one or more financial service systems. The data may be conditioned, as was described above, to exist in a compatible format in the raw data storage module 600.

The processed data storage module 602 stores a processed data set. In an embodiment, the processed data set includes data selected from the persistent raw data set based on a set of fixed business rules. The fixed set of business rules may be encoded in software. The fixed set of business rules may be also be stored in a database, in a file, or in other computer-readable media (e.g., a read-only device).

The decision module 604 determines a scope of a configurable business rule and adaptively applies the configurable business rule to the persistent raw data set or the processed data set based on the determination of the scope of the configurable business rule, to obtain an output data set. The configurable business rule may be configurable by a user or the market performance analysis system 102, in various embodiments. For example, a user may wish to obtain analytical results based on projected or simulated conditions. Using a configurable business rule, the user may apply the rule to the persistent data set or the processed data set. The user, however, would not want to have a configurable business rule applied to the processed data set when the processed data set has already been modified by a business rule that is substantially similar to the configurable business rule. Doing so may cause confusion or present inaccurate results.

In a further embodiment, the decision module 604 determines whether the configurable business rule is substantially similar to a rule in the set of fixed business rules, and then defines the scope of the configurable business rule based on the determination of whether the configurable business rule is substantially similar to a rule in the set of fixed business rules. For example, a fixed business rule may be designed to remove inactive customers from an accounting of customers using the rule "if customer inactive for more than 6 months, then do not count." In this case, a configurable business rule that seeks to perform a similar filtering on the processed data may not be applied as expected. For example, if the configurable business rule stated: "if customer inactive for more than 3 months, then do not count," the resulting data set would be under-inclusive due to the previously applied fixed business rule. Because of the similarity of the business rules, the configurable business rule should be applied to the persistent data set (e.g., raw data), instead of the intermediate data set (e.g., processed data) to obtain the more accurate result.

In an embodiment, the configurable business rule comprises a rule based on a relationship between two or more different financial service products selected from the financial service industries of banking, insurance, and investments.

In an embodiment, the configurable business rule is selected to obtain a predetermined target result. For example, a business unit may use a target or goal and then manipulate the configurable business rules to achieve the target or goal amount by working backwards.

In an embodiment, the configurable business rule is restricted to a subset of data based on a user's role. For example, analysts in a particular department may only be allowed to view and obtain reports on data related to their particular department. Similarly, managers may be restricted from viewing rolled-up data results for other areas of a company.

In an embodiment, the configurable business rule is designed to alter a product type to obtain a simulated actual count in the output data set. For example, in some cases, a financial product may be able to be subjectively classified as one of several types of products. For business purposes, the financial product may be classified as one product type for some reports and as another product type for other reports, depending on the determination of the product within the context of the respective report.

In an embodiment, the configurable business rule is designed to alter a product owner to obtain a simulated actual count in the output data set. Similar to manipulating product types, product owners may also be ambiguous in some situations. For example, a product may be offered by two separate branches of the same company. However, if both branches counted the product in their reports, the product may be inadvertently double-counted. A business rule may be constructed to artificially assign the product to one owner, which may increase the clarity and accuracy of the resulting data.

The output module 606 presents the output data set. In an embodiment, the output module 606 presents the output data to a user at the client computer 104 within a graphical user-interface. The graphical user-interface may be included in an internet browsing software, or other client software. In an embodiment, the output module 606 presents the output data to a user as a file. The file may include a database, a spreadsheet, a flat file (e.g., a comma-delimited format), a report, or other organized output.

FIG. 7 is a flowchart illustrating a method 700 according to various embodiments. At 702, a persistent raw data set is stored. At 704, a processed data set is stored. In an embodiment, the processed data set comprises data selected from the persistent raw data set based on a set of fixed business rules.

At 706, a scope of a configurable business rule is determined and adaptively applied to the persistent raw data set or the processed data set based on the determination of the scope of the configurable business rule. The result of the application of the business rule is stored in an output data set. In a further embodiment, determining the scope of the business rule includes determining whether the configurable business rule is substantially similar to a rule in the set of fixed business rules and defining the scope of the configurable business rule based on the determination of whether the configurable business rule is substantially similar to a rule in the set of fixed business rules.

In an embodiment, the configurable business rule comprises a rule based on a relationship between two or more different financial service products selected from the financial service industries of banking, insurance, and investments. In an embodiment, the configurable business rule is selected to obtain a predetermined target result. In an embodiment, the configurable business rule is restricted to a subset of data based on a user's role. In an embodiment, the configurable business rule is designed to alter a product type to obtain a simulated actual count in the output data set. In an embodiment, the configurable business rule is designed to alter a product owner to obtain a simulated actual count in the output data set. At 708, the output data set is presented.

Hardware and Software Platform

Figure 8:
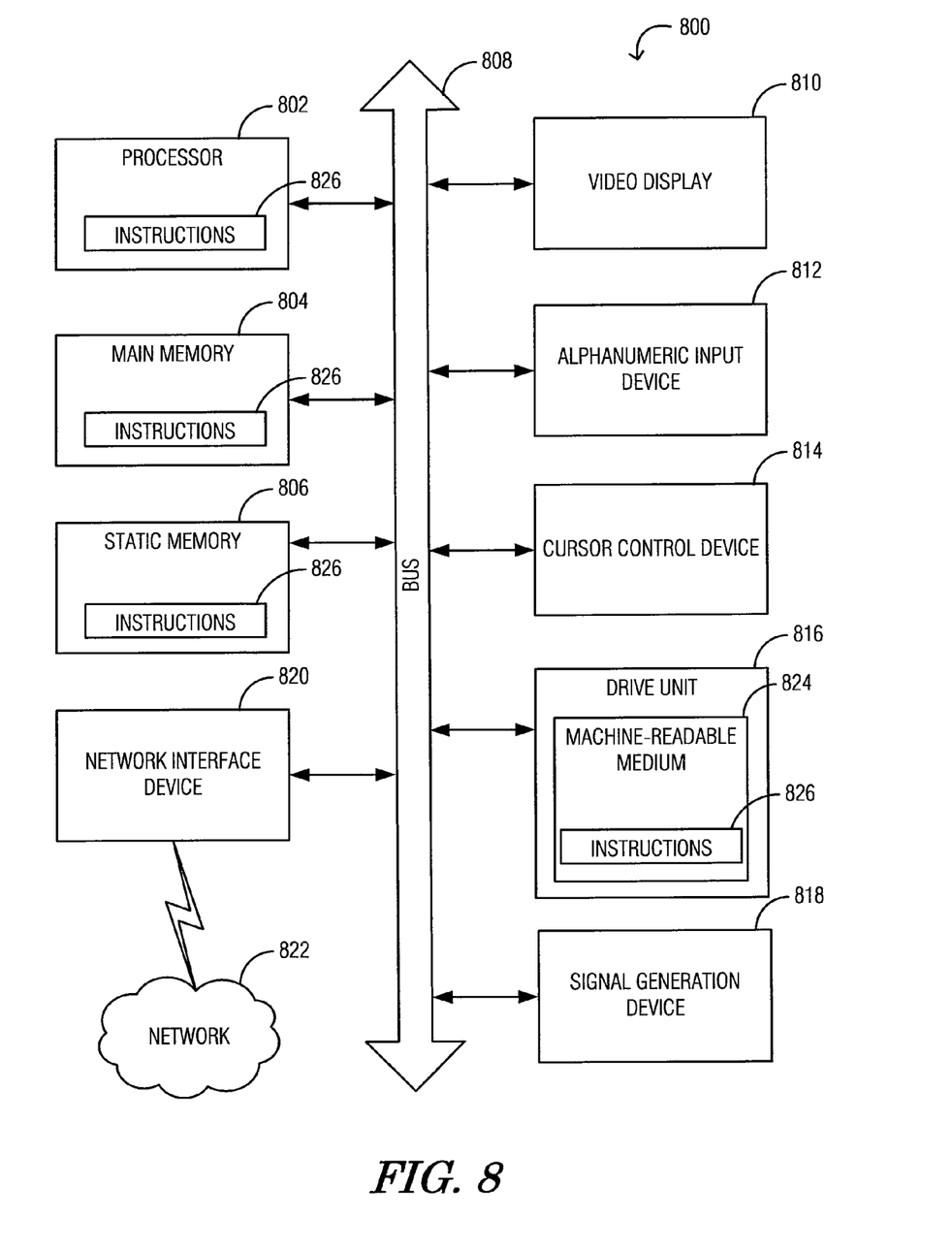
FIG. 8 is a block diagram illustrating a machine in the example form of a computer system, within which a set or sequence of instructions for causing the machine to perform any one of the methodologies discussed herein may be executed, according to various embodiments.

FIG. 8 is a block diagram illustrating a machine in the example form of a computer system 800, within which a set or sequence of instructions for causing the machine to perform any one of the methodologies discussed herein may be executed, according to various embodiments. In alternative embodiments, the machine may comprise a computer, a network router, a network switch, a network bridge, Personal Digital Assistant (PDA), a cellular telephone, a web appliance, set-top box (STB) or any machine capable of executing a sequence of instructions that specify actions to be taken by that machine.

The computer system 800 includes a processor 802, a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker) and a network interface device 820 to interface the computer system to a network 822.

The disk drive unit 816 includes a machine-readable medium 824 on which is stored a set of instructions or software 826 embodying any one, or all, of the methodologies described herein. The software 826 is also shown to reside, completely or at least partially, within the main memory 804 and/or within the processor 802. The software 826 may further be transmitted or received via the network interface device 820.

For the purposes of this specification, the term "machine-readable medium" or "computer-readable medium" shall be taken to include any medium which is capable of storing or encoding a sequence of instructions for execution by the machine and that cause the machine to perform any one of the methodologies. The terms "machine-readable medium" or "computer-readable medium" shall accordingly be taken to include, but not be limited to, solid-state memories, optical and magnetic disks, and other temporary, transient, or permanent storage means, such an executable streaming downloadable program. Further, it will be appreciated that the software could be distributed across multiple machines or storage media, which may include the machine-readable medium.

Method embodiments described herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer-readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAM's), read only memories (ROM's), and the like.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. For example, one module may be implemented as multiple logical modules, or several modules may be implemented as a single logical module. As another example, modules labeled as "first," "second," and "third," etc., may be implemented in a single module, or in some combination of modules, as would be understood by one of ordinary skill in the art.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72(b), which requires that it allow the reader to quickly ascertain the nature of the technical disclosure. It is submitted with the understanding that it will not be used to interpret or limit the scope or meaning of the claims.

What is claimed is:

1. A system comprising:
    a network having a number of computing devices wherein at least one of the computing devices includes:
    a data integration module configured to receive data from two or more different financial service systems selected from a banking system, an insurance system, and an investment system;
    a data transformation module configured to transform the data to a compatible format;
    a data storage module configured to store a rolling window of the transformed data in a persistent raw data store, wherein a window size of the rolling window is based on the financial service system from which the data was received;
    an analytic module configured to use a first simulated business rule to condition data stored in the persistent raw data store to determine how to obtain a predetermined target result and to use a second simulated business rule to determine a desired confidence level in the conditioned data, wherein a simulated business rule uses simulated variables to filter the data; and
    a report module configured to organize the conditioned data for simulation reporting, wherein the desired confidence level is used to dismiss a portion of the conditioned data from reporting.

2. The system of claim 1, further comprising a presentation module configured to present a report using the organized conditioned data.

3. The system of claim 2, wherein the presentation module is further configured to present the report using a product view.

4. The system of claim 3, wherein the product view is based on distinguishing account-type products from agreement-type products.

5. The system of claim 2, wherein the report comprises an indication of a basis of each of a number of values of the conditioned data represented in the report.

6. The system of claim 1, wherein the second simulated business rule is configured and applied to an intermediate data set based on how the first simulated business rule filtered the data, wherein the intermediate data set comprises raw data that is filtered by the first simulated business rule.

7. The system of claim 5, wherein the basis of at least one of the number of values comprises a data lineage.

8. A method for market performance analysis that comprises:
receiving data from two or more different financial service systems selected from a banking system, an insurance system, and an investment system;
transforming by a computer the data to a compatible format;
storing a rolling window of the transformed data in a persistent raw data store, wherein a window size of the rolling window is based on the financial service system from which the data was received;
using by the computer a first simulated business rule to condition data stored in the persistent raw data store to determine how to obtain a predetermined target result and using by the computer a second simulated business rule to determine a desired confidence level in the conditioned data, wherein a simulated business rule uses simulated variables to filter the data, and;
organizing the conditioned data for simulation reporting, wherein the desired confidence level is used to dismiss a portion of the conditioned data from reporting.

9. The method of claim 8, further comprising presenting a report using the organized conditioned data.

10. The method of claim 9, wherein presenting the report using the organized conditioned data further comprises presenting the report using a product view.

11. The method of claim 10, wherein the product view is based on distinguishing account-type products from agreement-type products.

12. The method of claim 9, wherein the report comprises an indication of a basis of each of a number of values of the conditioned data represented in the report.

13. The method of claim 12, wherein the basis of at least one of the number of values comprises a business rule used to obtain the value.

14. The method of claim 12, wherein the basis of at least one of the number of values comprises a data lineage.

15. A non-transitory computer-readable medium including instructions that, when performed by a computer, cause the computer to:
receive data from two or more different financial service systems selected from a banking system, an insurance system, and an investment system;
transform the data to a compatible format;
store a rolling window of the transformed data in a persistent raw data store, wherein a window size of the rolling window is based on the financial service system from which the data was received;
use a first simulated business rule to condition data stored in the persistent raw data store, and use a second simulated business rule to determine a desired confidence level in the conditioned data wherein a simulated business rule uses simulated variables to filter the data; and
organize the conditioned data for simulation reporting, wherein the desired confidence level is used to dismiss a portion of the conditioned data from reporting.

16. The non-transitory computer-readable medium of claim 15, further comprising instructions that cause the computer to present a report using the organized conditioned data.

17. The non-transitory computer-readable medium of claim 16, wherein the instructions that cause the computer to present the report using the organized conditioned data further comprise instructions that cause the computer to present the report using a product view.

18. The non-transitory computer-readable medium of claim 17, wherein the product view is based on distinguishing account-type products from agreement-type products.

19. The non-transitory computer-readable medium of claim 16, wherein the report comprises an indication of a basis of each of a number of values of the conditioned data represented in the report.

20. The non-transitory computer-readable medium of claim 19, wherein the basis of at least one of the number of values comprises a business rule used to obtain the value.

21. The non-transitory computer-readable medium of claim 19, wherein the basis of at least one of the number of values comprises a data lineage.

* * * * *